US006687587B2

(12) United States Patent
Kacel (10) Patent No.: US 6,687,587 B2
(45) Date of Patent: Feb. 3, 2004

(54) METHOD AND SYSTEM FOR MANAGING VEHICLE CONTROL MODULES THROUGH TELEMATICS

(75) Inventor: Richard J. Kacel, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 21 days.

(21) Appl. No.: 10/026,035

(22) Filed: Dec. 21, 2001

(65) Prior Publication Data

US 2003/0120395 A1 Jun. 26, 2003

(51) Int. Cl.$^7$ ............................. G06F 19/00; H04B 1/38
(52) U.S. Cl. ............................................. 701/33; 701/36
(58) Field of Search ............................ 701/1, 33, 36, 701/2

(56) References Cited

U.S. PATENT DOCUMENTS

| | | | | |
|---|---|---|---|---|
| 5,442,553 A | * | 8/1995 | Parrillo | 455/420 |
| 5,717,387 A | * | 2/1998 | Suman et al. | 701/36 |
| 6,061,613 A | * | 5/2000 | Zyburt et al. | 701/24 |
| 6,127,947 A | * | 10/2000 | Uchida et al. | 340/999 |
| 6,181,994 B1 | * | 1/2001 | Colson et al. | 701/33 |
| 6,321,142 B1 | * | 11/2001 | Shutty | 701/1 |
| 6,370,449 B1 | * | 4/2002 | Razavi et al. | 701/1 |
| 6,370,456 B1 | * | 4/2002 | Eiting et al. | 701/33 |
| 6,487,717 B1 | * | 11/2002 | Brunemann et al. | 717/173 |
| 6,501,368 B1 | * | 12/2002 | Wiebe et al. | 340/3.1 |
| 6,526,460 B1 | * | 2/2003 | Dauner et al. | 710/65 |
| 2002/0019877 A1 | * | 2/2002 | Wrede | 709/230 |
| 2002/0035429 A1 | * | 3/2002 | Banas | 701/115 |
| 2003/0042792 A1 | * | 3/2003 | Reinold et al. | 307/9.1 |

* cited by examiner

Primary Examiner—Michael J. Zanelli
(74) Attorney, Agent, or Firm—Anthony Luke Simon (57) ABSTRACT

One aspect of the present invention provides a method of assembling a vehicle using a communication node. A telematics module, which is operatively adapted to communicate with the communication node, is connected to the vehicle. At least one control module, for controlling at least one vehicle function, is connected to the vehicle and is also in communication with the telematics module. A command is issued for the at least one vehicle function, from the communication node to the control module. Programs and systems of using the method are also provided.

17 Claims, 5 Drawing Sheets

METHOD AND SYSTEM FOR MANAGING VEHICLE CONTROL MODULES THROUGH TELEMATICS

FIELD OF THE INVENTION

This invention relates generally to control modules, which control various functions in mobile vehicles. More specifically, the invention relates to a method and system for managing a plurality of control modules in a mobile vehicle using at least one central telematics module.

BACKGROUND OF THE INVENTION

Wireless communication services for mobile vehicles, such as navigation and roadside assistance, have increased rapidly in recent years. Most of the services that have been offered are for a mobile vehicle in operation, but more recently, the demands and potential for services to a vehicle in the factory and in a service center have grown. Services that may be provided in the factory may be related to the assembly of the vehicle or the servicing and updating of the vehicle's functions during the life of the vehicle.

For example, in the factory, a vehicle may include several control modules for controlling various functions such as the vehicle's airbag system or the vehicle brake system. Each of these control modules requires programming as the vehicle is being assembled. After the vehicle is assembled, a control module may be serviced at a later date and may require reprogramming. For example, a vehicle's window/door system may fail and be replaced. The replacement control module for the window/door system will be reprogrammed after placement in the vehicle. Additionally, vehicle software, like software applications in other areas, is constantly being upgraded. This software is reprogrammed by recalling vehicles to the manufacturer or to service centers for reprogramming of control modules.

Currently, programming and reprogramming of control modules is accomplished by manually programming a given control module. For example, as a vehicle is being assembled, each individual module is attached to a control panel, such as a small programming computer or laptop. Each module is then individually programmed to perform a limited set of functions. The modules may also be provided with a limited set of options. After a vehicle is assembled, if a control module is replaced, it must again be attached to a control panel for reprogramming. If software for a given control module changes, e.g. is updated or requires changes based on user preference, the module must be accessed (the vehicle opened up) and then attached to a control panel for reprogramming.

A method and system are needed, therefore, to manage one or more control modules using at least one central telematics module to take advantage of wireless communication capabilities. This would result in decreased number of control panels required for programming or reprogramming control modules. This would also result in less need for opening a vehicle up to service software. This would also result in increased flexibility of software services. For example a subscriber could download software for existing vehicle functions from a wireless network. Thus, the method and system of the present invention may result in increased subscriber satisfaction with the services and increased availability of services.

It is an object of this invention, therefore, to provide a method for managing a plurality of control modules in a mobile vehicle, which overcomes the above obstacles and accomplishes the objectives described above.

SUMMARY OF THE INVENTION

One aspect of the present invention provides a method of assembling a vehicle using a communication node. A telematics module, which is operatively adapted to communicate with the communication node, is connected to the vehicle. At least one control module, for controlling at least one vehicle function, is connected to the vehicle and is also in communication with the telematics module. A command is issued for the at least one vehicle function, from the communication node to the control module.

The command for the at least one vehicle function may be issued from the communication node to the telematics module and forwarded to the control module. Additional control modules may be provided in the vehicle, the additional control modules in communication with the telematics module and operatively adapted to control other vehicle functions. A command for the other vehicle functions may also be forwarded from the communication node to the additional control modules via the telematics module.

Another aspect of the present invention provides a method of servicing a vehicle using a communication node. A telematics module from the vehicle communicates with the communication node. The telematics module may be connected to a control module that is adapted to control at least one vehicle function. The communication may issue a command for the vehicle function to the telematics module, which may, in turn, forward the command from the telematics module to the control module.

The control module may be an added control module operatively adapted to control an added vehicle function. Alternatively, the control module may be a replacement control module operatively adapted to control an existing vehicle function. An existing control module, operatively adapted to control an existing vehicle function may be removed for replacement.

Another aspect of the present invention provides a method of remotely servicing a vehicle function using a communication node. A telematics module in the vehicle communicates with the communication node. The telematics module may be in communication with at least one control module in the vehicle, which is operatively adapted to control at least one vehicle function. A command for the at least one vehicle function may be issued from the communication node to the control module. For example, the command may be a software bulletin command. Alternatively, the command may update existing software for controlling the vehicle function.

Yet another aspect of the present invention provides computer program product in a computer usable medium for assembling a vehicle. The program includes means for connecting a telematics module, adapted to communicate with the communication node, to the vehicle; means for connecting at least one control module to the vehicle, which is in communication with the telematics module and operatively adapted to control at least one vehicle function; and means for issuing a command for the at least one vehicle function, from the communication node to the control module.

The program may also include means for issuing a command for the at least one vehicle function, from the communication node to the telematics module; and means for forwarding the command from the telematics module to the control module. The program may also include means for providing an additional control module in the vehicle, the additional control module in communication with the telematics module and operatively adapted to control at least one other vehicle function, as well as means for forwarding a command for the at least one other vehicle function, from the communication node to the additional control module via the telematics module.

Yet another aspect of the present invention provides computer program product in a computer usable medium for servicing a vehicle using a communication node. The program may include means for communicating with the communication node from a telematics module in the vehicle; means for connecting the telematics module to an added control module, which is adapted to control at least one vehicle function; means for issuing a command from the communication node to the telematics module for the vehicle function; and means for forwarding the command from the telematics module to the added control module. The program may also include means for removing an existing control module, the existing control module operatively adapted to control an existing vehicle function.

Yet another aspect of the present invention provides computer program product in a computer usable medium for remotely servicing a vehicle function.

The program includes means for communicating with the communication node from a telematics module in the vehicle; means for providing at least one control module in the vehicle that is in communication with the telematics module and operatively adapted to control at least one vehicle function; and means for remotely issuing a command for the at least one vehicle function, from the communication node to the control module. The program may also include means for updating existing software for controlling the vehicle function.

Yet another aspect of the present invention provides a vehicle assembly system that includes means for connecting a telematics module that is adapted to communicate with a communication node to the vehicle. The system may also include means for connecting at least one control module which is in communication with the telematics module and which controls at least one vehicle function to the vehicle, as well as means for issuing a command for the at least one vehicle function, from the communication node to the control module.

The system may also include means for issuing a command from the communication node to the telematics module for the at least one vehicle function, and means for forwarding the command from the telematics module to the control module. The system of the present invention may also an additional control module in the vehicle, which is in communication with the telematics module and operatively adapted to control at least one other vehicle function; and means for forwarding a command for the at least one other vehicle function, from the communication node to the additional control module via the telematics module.

Yet another aspect of the present invention provides a vehicle service system that includes means for communicating with the communication node from a telematics module in the vehicle; means for connecting the telematics module to an added control module, the added control module operatively adapted to control at least one vehicle function; means for issuing a command for the vehicle function, from the communication node to the telematics module; as well as means for forwarding the command from the telematics module to the added control module. The system may also include means for removing an existing control module, the existing control module operatively adapted to control an existing vehicle function.

Yet another aspect of the present invention provides a remote vehicle service system which includes means for communicating with the communication node from a telematics module in the vehicle as well as means for providing at least one control module in the vehicle, the control module in communication with the telematics module and operatively adapted to control at least one vehicle function. The system may also include means for remotely issuing a command for the at least one vehicle function, from the communication node to the control module as well as means for updating existing software for controlling the vehicle function.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
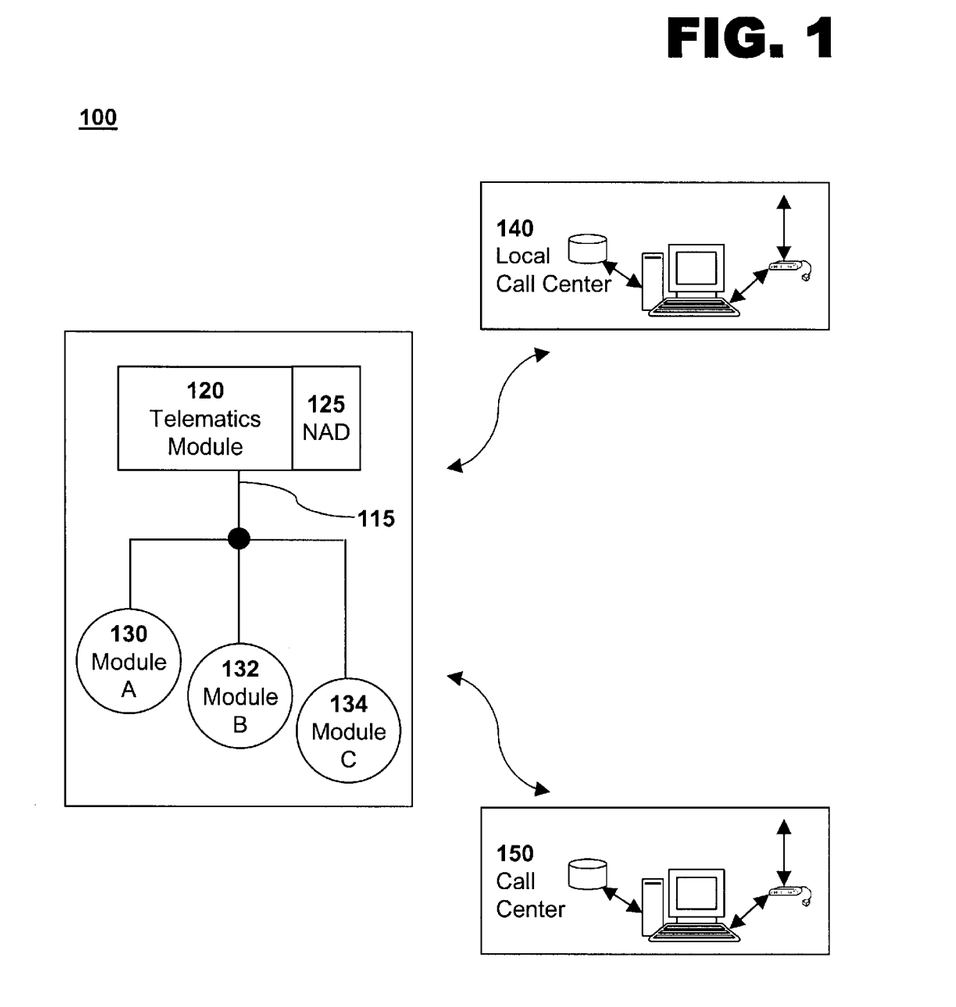
FIG. 1 is a schematic diagram of one embodiment of a system for managing a plurality of control modules in a mobile vehicle in accordance with the present invention.

FIG. 1 shows an illustration of one embodiment of a system for managing a plurality of control modules in a mobile vehicle, in accordance with the present invention at 100.

Management system 100 may comprise one or more telematics modules 120. Telematics module 120 may be connected to or in communication with a network access device (NAD) 125. Management system 100 may also comprise one or more control modules 130, 132, 134. Although FIG. 1 shows three control modules, any suitable number of control modules may be included in management system 100. Control modules 130, 132, 134 may be connected to or in communication with telematics module 120 via data communication bus 115. Telematics module 120 may be in communication with one or more communication nodes, such as local call center 140 or call center 150, via any suitable wireless communication means as described further below.

Telematics module 120 may be, for example, any suitable device that is able to communicate with and program one or more control modules 130, 132, 134. Telematics module 120 may comprise software and/or hardware that enables telematics module 120 to communicate with and program one or more control modules 130, 132, 134. For example, telematics module 120 may comprise computer readable software that is enabled to command a control module. This software may be any suitable software as are known in the art for controlling and programming a control module, including, for example, software for turning on or off various outputs or inputs, software for gathering information about various outputs or inputs and software for controlling mathematical calculations that use data from the various outputs and inputs. Telematics module 120 may also comprise communication protocols that enable telematics module 120 to communicate with one or more control modules. These communication protocols may be any suitable communication protocols as are known in the art for communicating with control modules. Telematics module 120 may also comprise one or more hardware interfaces that enable telematics module 120 to connect to and/or communicate with data communication bus 115. These may be any suitable data communication bus interfaces as are known in the art. Telematics module 120 may also include hardware and electrical connections that enable telematics module 120 to be physically connected to one or more control modules 130, 132, 134 if necessary.

Network access device (NAD) 125 may be any suitable device that enables telematics module 120 to access one or more wireless communication networks. For example, network access device (NAD) 125 may be a cellular phone or a modified cellular communicator as is known in the art. Alternatively, NAD 125 may be an Ethernet device as is well known in the art. Alternatively, NAD 125 may be a device capable of using wireless communication protocols such as 802.11 (or 802.11a or 802.11b) or Bluetooth.

Control modules 130, 132, 134 may be any one of the electronic control modules that control vehicle functions in a motor vehicle. For example, one type of control module controls one or more airbag system vehicle functions. Another type of control module controls one or more engine vehicle functions. Yet another type of control module controls an array of window and door vehicle functions. Yet another type of control module controls one or more brake system vehicle functions. Although three control modules 130, 132, 134 are illustrated in FIG. 1, any suitable number of control modules may be controlled in accordance with the present invention. For example, in a typical vehicle, as many as twenty vehicle functions may be controlled by twenty different control modules, which may, in accordance with the present invention, be managed and controlled by telematics modules 120.

Each control module 130, 132, 134 may be characterized by a microprocessor, memory and an application program memory storage. The microprocessor of control modules 130, 132, 134 may be any suitable microprocessor as is well known in the art. The memory and memory storage may also be any suitable memory and memory storage known in the art. Each control module 130, 132, 134 may comprise one or more programs for controlling a vehicle function. The vehicle function control programs may be programmed or reprogrammed using data communication bus 115.

Data communication bus 115 may be any suitable data communication bus for allowing communication between telematics module 120 and control modules 130, 132, 134 as is well known in the art. Although one configuration of data bus 115 with control modules 130, 132, 134 is shown in FIG. 1, any suitable configuration of control modules 130, 132, 134 which enables communication with telematics module 120 via bus 115 may be used in accordance with the present invention. Information may be communicated over data communication bus 115 from one module 130 to one or more other modules 132, 134. Data communicated between control modules may be significant in overall control of the vehicle. Alternatively, information may be communicated over data bus 115 from one or more of modules 130, 132, 134 to telematics module 120.

By connecting telematics module 120 to data bus 115, the control modules 130, 132, 134 may be accessed by telematics module 120. An application program may then be sent to the telematics module 120 from one or more communication nodes, such as local virtual call center 140 or call center 150. This application program may enable telematics module 120 to program one or more of control modules 130, 132, 134 via data communication bus 115.

Local call center 140 may be a location where many calls may be received and serviced at the same time, or where many calls may be sent at the same time. In one embodiment of the invention, local call center 140 is a call center that is located nearby or in proximity to telematics module 120. For example, at a vehicle assembly location, telematics module 120 may be accessed by a local call center that is also located in the vehicle assembly location. Local call center 140 may be any suitable communication node for sending and receiving calls and providing services. Call center 140 may be a telematics call center, prescribing communications to and from mobile vehicles 210. Call center 140 may be a voice call center, providing verbal communications between an advisor in the call center and a subscriber in a mobile vehicle. The call center may contain any suitable combination of each of these functions.

Call center 150 may also be a location where many calls may be received and serviced at the same time, or where many calls may be sent at the same time. In one embodiment of the invention, call center 150 is a call center that is located remotely from telematics module 120. Call center 150 may be any suitable communication node for sending and receiving calls and providing services. Call center 150 may be a telematics call center, prescribing communications to and from mobile vehicles 210. Call center 150 may be a voice call center, providing verbal communications between an advisor in the call center and a subscriber in a mobile vehicle. The call center may contain any suitable combination of each of these functions.

Figure 2:
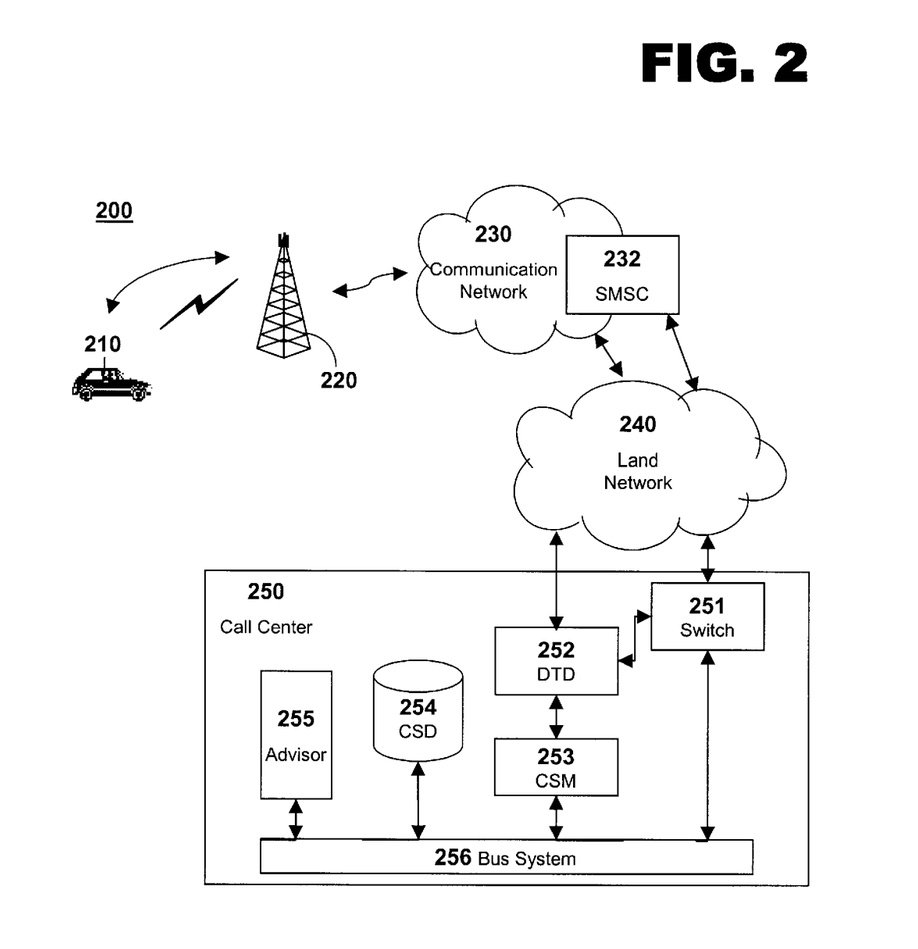
FIG. 2 is an illustration of one embodiment of a system for accessing a mobile vehicle, in accordance with the present invention.

FIG. 2 shows an illustration of one embodiment of a system for accessing a mobile vehicle using a wireless communication system, in accordance with the present invention at 200.

Mobile vehicle access system 200 may contain one or more mobile vehicles 210, one or more wireless carrier systems 220, one or more communication networks 230, one or more short message service centers (SMSC) 232, one or more land networks 240, and one or more call centers 250. Call center 250 may contain one or more switches 251, one or more data transmission devices (DTD) 252, one or more communication services managers (CSM) 253, one or more communication services databases (CSD) 254, one or more advisors 255, and one or more bus systems 256.

Mobile vehicle 210 may contain a wireless vehicle communication device, such as an analog or digital phone with suitable hardware and software for transmitting and receiving data communications. Mobile vehicle 210 may also contain a wireless modem for transmitting and receiving data. Mobile vehicle 210 may further contain a digital signal processor with software and additional hardware to enable communications with the mobile vehicle and to perform other routines and requested services. Mobile vehicle 210 may contain a global positioning system (GPS) unit capable of determining synchronized time and a geophysical location of the mobile vehicle. Mobile vehicle 210 may send to and receive radio transmissions from wireless carrier system 220.

Wireless carrier system 220 may be a wireless communications carrier. Wireless carrier system 220 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 220 may transmit to and receive signals from mobile vehicle 210. Wireless carrier system 220 may transmit to and receive signals from a second mobile vehicle 210. Wireless carrier system 220 may be connected with communications network 230.

Communications network 230 may comprise a mobile switching center. Communications network 230 may comprise services from one or more wireless communications companies. Communications network 230 may be any suitable system or collection of systems for connecting wireless carrier system 220 to a second mobile vehicle 210 or to a call center.

Communications network 230 may include one or more short message service centers 232. Short message service center 232 may prescribe alphanumeric short messages to and from mobile vehicles 210. Short message service center 232 may include message entry features, administrative controls, and message transmission capabilities. Short message service center 232 may store and buffer the messages. Short message services may include functional services such as paging, text messaging and message waiting notification. Short message services may include other telematics services such as broadcast services, time-driven message delivery, autonomous message delivery, and database-driven information services. The telematics services may further include message management features, such as message priority levels, service categories, expiration dates, cancellations, and status checks.

Land network 240 may be a public-switched telephone network. Land network 240 may be comprised of a wired network, an optical network, a fiber network, another wireless network, or any combination thereof. Land network 240 may comprise an Internet protocol (IP) network. Land network 240 may connect communications network 230 to a call center.

Land network 240 may connect a first wireless carrier system 220 with a second wireless carrier system 220. Communication network 230 and land network 240 may connect wireless carrier system 220 to a communication node or call center 250.

Call center 250 may be a location where many calls may be received and serviced at the same time, or where many calls may be sent at the same time. Call center 250 may be, for example, local call center 140 and/or call center 150, as described above. Call center 250 may be any suitable communication node for sending and receiving calls and providing services. Call center 250 may be a telematics call center, prescribing communications to and from mobile vehicles 210. Call center 250 may be a voice call center, providing verbal communications between an advisor in the call center and a subscriber in a mobile vehicle. Call center 250 may contain any suitable combination of each of these functions.

Call center 250 may contain switch 251. Switch 251 may be connected to land network 240, and may receive a modem signal from an analog modem or from a digital modem. Switch 251 may transmit voice or data transmission from the communication node. Switch 251 may also receive voice or data transmissions from mobile vehicle 210 through wireless carrier system 220, communications network 230, and land network 240. Switch 251 may receive from or send data transmissions to data transmission device 252. Switch 251 may receive from or send voice transmissions to advisor 255 via bus system 256.

Data transmission device 252 may send or receive data from switch 251. Data transmission device 252 may be an IP router or a modem. Data transmission device 252 may transfer data to or from advisor 255, one or more communication services managers 253, one or more communication services databases 254, and any other device connected to bus system 256. Data transmission device 252 may convey information received from short message service center 232 in communication network 230 to communication services manager 253.

Communication services manager 253 may be connected to switch 251, data transmission device 252, and advisor 255 through bus system 256. The call center may contain any combination of hardware or software facilitating data transmissions between call center 250 and mobile vehicle 210.

Communication services manager 253 may receive information from mobile vehicle 210 through wireless carrier system 220, short message service center 232 in communication network 230, land network 240, and data transmission device 252. Communication services manager 253 may send information to mobile vehicle 210 through data transmission device 252, land network 240, communication network 230 and wireless carrier system 220. Communication services manager 253 may send short message service messages via short message service center 232 to the mobile vehicle. Communication services manager 253 may receive short message service replies from mobile vehicle 210 via short message service center 232. Communication services manager 253 may send a short message service request to mobile vehicle 210.

Communication services database 254 may contain records on one or more mobile vehicles 210. A portion of communication services database 254 may be dedicated to short message services. Records in communication services database 254 may include vehicle identification, location information, status information, and recent action information regarding mobile vehicle 210. Communication services database 254 may provide information and other support to communication services manager 253.

Advisor 255 may be a real advisor or a virtual advisor. A real advisor may be a human being in verbal communication with mobile communication device 210. A virtual advisor may be a synthesized voice interface responding to requests from mobile communication device 210. Advisor 255 may provide services to mobile communication device 210. Advisor 255 may communicate with communication services manager 253 or any other device connected to bus system 256.

Figure 3:
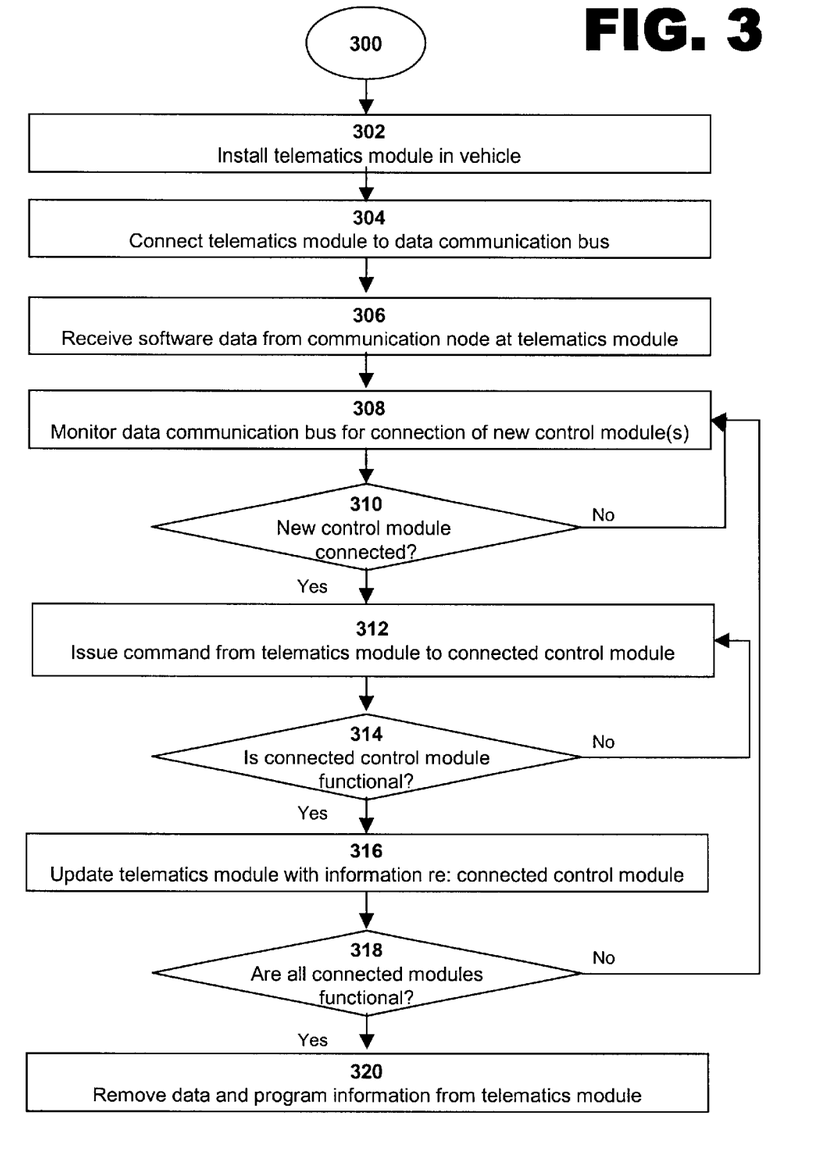
FIG. 3 is a flow diagram of one embodiment of a method for managing a plurality of control modules in a mobile vehicle in accordance with the present invention.

FIG. 3 shows a flow diagram of one embodiment of a method for controlling a plurality of control modules in a mobile vehicle accordance with the present invention at 300. The method shown in FIG. 3 may be used, for example, to program one or more control modules in a vehicle as the vehicle is being assembled.

As seen at block 302, at least one telematics module 120 may be placed into a mobile vehicle, such as vehicle 210. Telematics module 120 may be a suitable device as described above which is enabled to communicate with one or more communication nodes 140, 150. This placement may involve connecting the telematics module 120 to vehicle 210 with suitable hardware as is well known in the art. The installation of a module in a mobile vehicle 210 is also well known in the art and may be accomplished, for example, as part of a standard vehicle assembly line process.

As seen at block 304, telematics module 120 may then be connected to a suitable data communication bus 115. For example, data communication bus 115 may be an already installed component of vehicle 210. Alternatively, bus 115 may be connected to vehicle 210 by connecting bus 115 to telematics module 120 after the module has been installed. The installation of a data bus 115 in a mobile vehicle is also well known in the art and may be accomplished, for example, as part of a standard vehicle assembly line process.

As seen at block 306, telematics module 120 may receive software data from any suitable source, such as, for example one or more communication nodes 140, 150. This software data may include, for example, one or more commands which enable telematics module 120 to communicate with and manage one or more control modules 130, 132, 134. The software data may also be, for example, data that indicates specifications for one or more control modules (e.g., "the brake system control module for vehicle type D should have characteristics x, y, and z", "the airbag system control module for vehicle type E should have characteristics p, q, and r".). Telematics module 120 may use the software data to program or reprogram control modules 130, 132, 134. The software data may also include commands that enable telematics module 120 to test the efficacy of control modules 130, 132, 134. The software data may also include commands that enable other functions of telematics module 120 such as the monitoring of data bus 115 or other input, output and calculation functions.

As seen at block 308, telematics module 120 may monitor data communication bus 115 to determine if a control module has been connected to data communication bus 115. Control module 130, 132, 134 may be an already installed component of vehicle 210 which is subsequently connected to data communication bus 115. Alternatively, control module 130, 132, 134 may be connected to bus 115 in order to install control module 130, 132, 134 in vehicle 210. The installation of a control module 130, 132, 134 in a mobile vehicle is also well known in the art and may be accomplished, for example, as part of a standard vehicle assembly line process.

As seen at block 310, telematics module 120 may be used to determine if a control module has been connected to data bus 115. If a module 130, 132, 134 has not been connected, telematics module 120 may continue to monitor data bus 115.

Alternatively, if a module has been connected, telematics module 120 may issue one or more commands to the added control module as seen at block 312. This command may be, for example, a command that programs or reprograms the control module 130, 132, 134. The command may indicate to the control module how to communicate with the data bus 115 or the telematics module 120. The command may also indicate to the control module how to perform certain functions, such as processing data or performing calculations.

As seen at block 314, telematics module 120 may determine if the added control module is functional. In one embodiment of the invention, the control module may be functional once it has received all of a predetermined set of software instructions from telematics module 120. Alternatively, telematics module 120 may determine that the control module 130, 132, 134 is functional if the control module is able to perform a predetermined set of functions. That is, telematics module 120 may be enabled to test a control module to determine if the module is functioning.

If the added control module is not yet functional, telematics module 120 may return to block 312 and continue to issue commands until the control module 130, 132, 134 is determined to be functional.

As seen at block 316, once the control module 130, 132, 134 is determined to be functional, telematics module 120 may be updated with information about the added control module. Such information may include the hardware and software specifications of the control module as well information about the control module's compatibility with other control modules, with various vehicle systems and/or with telematics module 120.

In some embodiments of the invention, telematics module 120 may then determine if all control modules connected to data bus 115 have been programmed suitably as seen at block 318. For example, all connected control modules may be considered suitably programmed if they have all received a complete predetermined set of software instructions from telematics module 120. Alternatively, telematics module 120 may be considered suitably programmed if they are all able to perform a predetermined set of functions. That is, telematics module 120 may be enabled to do a system wide test of all connected control modules. Alternatively, telematics module 120 may be enabled with a checklist of the number and/or type of control modules 130, 132, 134 to be installed in a particular vehicle and, once the checklist is completed, telematics module may determine that all control modules 130, 132, 134 have been suitably programmed.

If all connected control modules are not determined to be suitably programmed, telematics module 120 may return to block 308 and continue to monitor data communication bus 115 until all control modules 130, 132, 134 are determined to be functional and/or suitably programmed.

If, as seen at block 320, all connected modules are suitably programmed, data for each of the control modules and programming information for each of the modules may be removed from telematics module 120.

As may be seen from the above description, telematics module 120 may be able to program control modules 130, 132, 134 one at a time as they are connected to data bus 115 and in communication with telematics module 120. For example, using the embodiment of FIG. 1, in a standard assembly line procedure, the control module 130 may be connected and then programmed using telematics module 120. Control module 132 may then be subsequently connected and then programmed. Alternatively, control module 130 may be connected, followed by control module 132, control module 134, etc.; until all control modules to be installed have been connected. Once all control modules are connected, telematics module 120 may be used to program all the connected control modules at once. Alternatively, a combination of these techniques may be used to connect and program a plurality of control modules 130, 132, 134 in accordance with the present invention.

Figure 4:
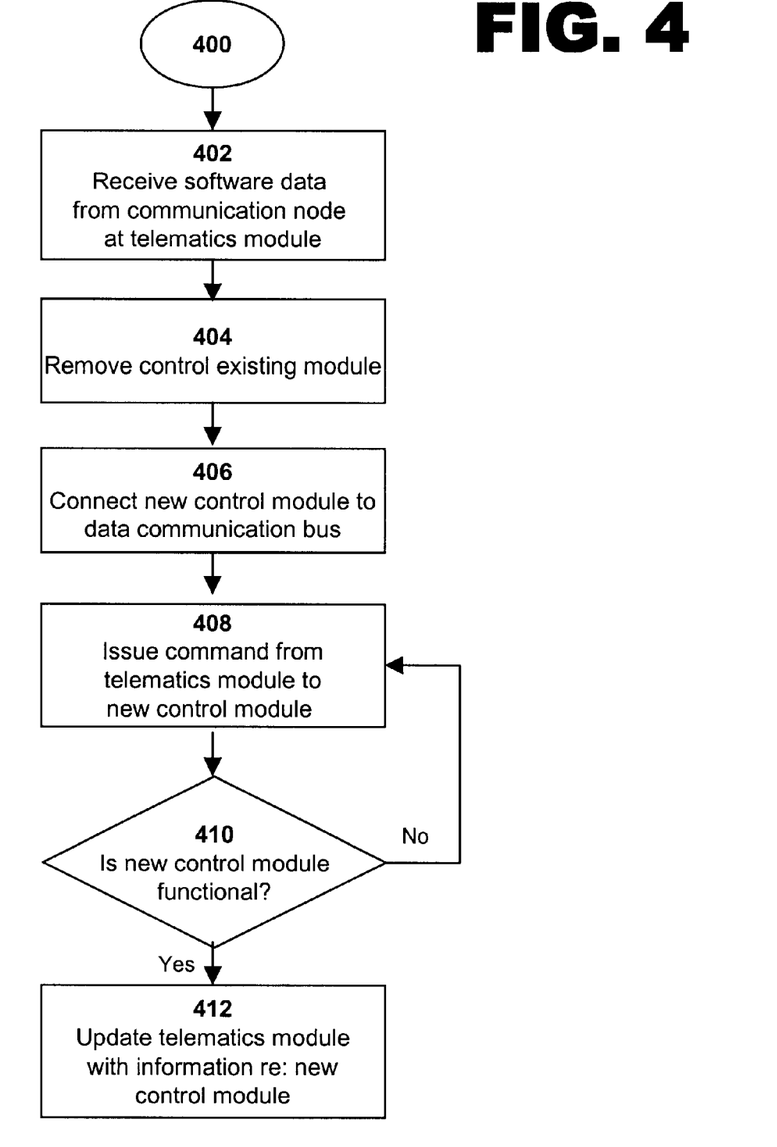
FIG. 4 is a flow diagram of another embodiment of a method for managing a plurality of control modules in a mobile vehicle in accordance with the present invention.

FIG. 4 shows a flow diagram of one embodiment of a method for controlling a plurality of control modules in a mobile vehicle accordance with the present invention at 400. The method shown in FIG. 4 may be used, for example, to manage one or more control modules in a vehicle as the vehicle is being locally serviced, for example, at a vehicle service center.

The method of FIG. 4, may be used, for example, with a telematics module 120 that has already been placed into a mobile vehicle, such as vehicle 210. Telematics module 120 may be a suitable device as described above which is enabled to communicate with one or more communication nodes 140, 150. In addition, telematics module 120 may already be connected to a suitable data communication bus 115 and in communication with one or more control modules 130, 132, 134.

As seen at block 402, telematics module 120 may receive software data to be used by a given control module 130, 132, 134. Telematics module 120 may receive this software data from any suitable source, such as, for example one or more communication nodes 140, 150. This software data may include, for example, one or more commands that enable telematics module 120 to communicate with and manage one or more newly installed control modules 130, 132, 134. The software data may also be, for example, data that indicates specifications for one or more control modules (e.g., "the brake system control module for a sports car must include software for anti-lock brakes", "the door/window system control module for a minivan must include software for child safety locks".) Telematics module 120 may use the software data to program or reprogram newly installed control modules 130, 132, 134.

The software data may also include commands that enable telematics module 120 to test the efficacy of a given control module 130, 132, 134. Alternatively, the software data may enable other functions of telematics module 120 in communication with a given control module, such as the monitoring of control modules 130, 132, 134. Thus, at a service center, telematics module 120 may be used to test a newly installed control module's efficacy or functions. This may be particularly useful in cases where telematics module 120 is used to gather information about a given control module's functioning while the vehicle is in use. Thus telematics module 120 may be able to communicate specific, use-based data to communication nodes 140, 150 in order to receive specific software data. For example, telematics module 120 may transmit information to the communication node 140, 150 about a brake system control module to be replaced in vehicle 210. This information may be used by service technicians to determine which new brake system control module to install.

As seen at block 404, the existing control module may be removed. Removal of a vehicle system control module is accomplished using methods well known in the art, including standard service center removal methods. In an alternate embodiment of the invention, new control module 130, 132, 134 is not a replacement module and, thus, no existing control module is removed.

As seen at block 406, new control module 130, 132, 134 may be connected to bus 115 in order to install control module 130, 132, 134 in vehicle 210. The installation of a control module 130, 132, 134 in a mobile vehicle is also well known in the art and may be accomplished, for example, as part of a standard vehicle assembly line process.

As seen at block 408, once the new module has been connected, telematics module 120 may issue one or more commands to the new control module. This command may be, for example, a command that programs or reprograms the control module 130, 132, 134. This command may include, for example, data about the previous vehicle system control module if there was one. The command may indicate to the control module how to communicate with the data bus 115 or the telematics module 120. The command may also indicate to the control module how to perform certain functions, such as processing data or performing calculations.

As seen at block 410, telematics module 120 may determine if the added control module is functional. In one embodiment of the invention, the control module may be functional once it has received all of a predetermined set of software instructions from telematics module 120. Alternatively, telematics module 120 may determine that the control module 130, 132, 134 is functional if the control module is able to perform a predetermined set of functions. That is, telematics module 120 may be enabled to test a control module to determine if the module is functioning.

If the added control module is not yet functional, telematics module 120 may return to block 408 and continue to issue commands until the control module 130, 132, 134 is determined to be functional.

As seen at block 412, once the control module 130, 132, 134 is determined to be functional, telematics module 120 may be updated with information about the added control module. Such information may include the hardware and software specifications of the control module as well as information about the control module's compatibility with other control modules, with various vehicle systems and/or with telematics module 120.

Figure 5:
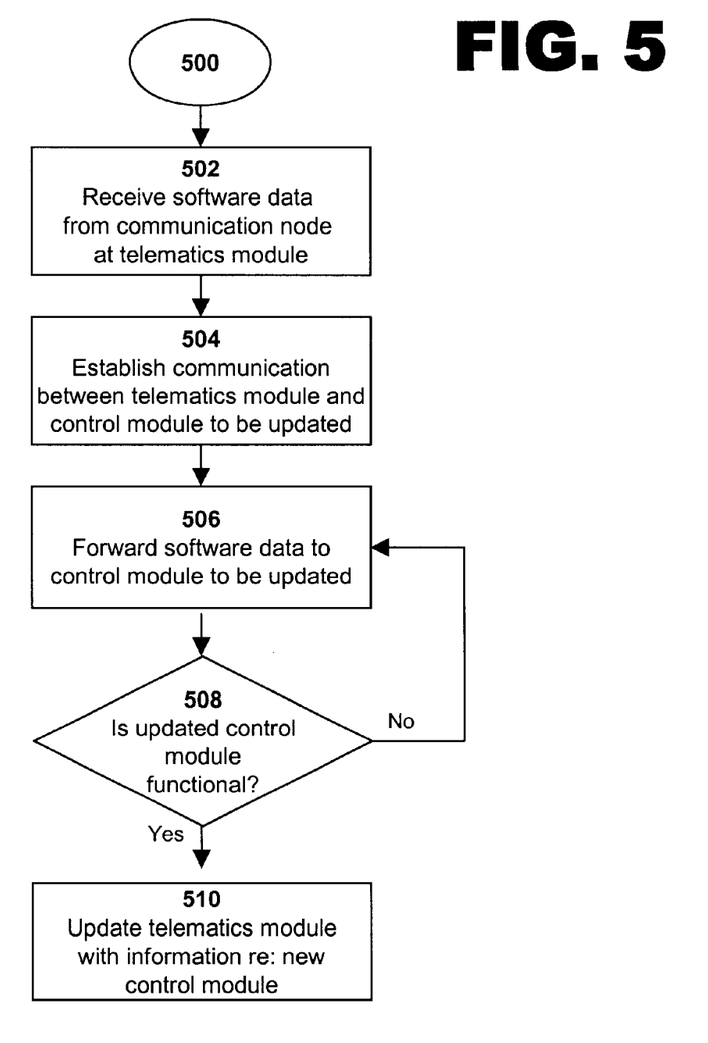
FIG. 5 is a flow diagram of another embodiment of a method for managing a plurality of control modules in a mobile vehicle in accordance with the present invention.

FIG. 5 shows a flow diagram of one embodiment of a method for controlling a plurality of control modules in a mobile vehicle accordance with the present invention at 500. The method shown in FIG. 5 may be used, for example, to update software for one or more control modules in a vehicle remotely, e.g., without bringing the vehicle to a service center. The method may furthermore allow the programming of vehicle systems according to user preferences.

The method of FIG. 5, may be used, for example, with a telematics module 120 that has already been placed into a mobile vehicle, such as vehicle 210. Telematics module 120 may be a suitable device as described above which is enabled to communicate with one or more communication nodes 140, 150. In addition, telematics module 120 may already be connected to a suitable data communication bus 115 and in communication with one or more control modules 130, 132, 134.

As seen at block 502, telematics module 120 may receive software data to be used by a given control module 130, 132, 134. Telematics module 120 may receive this software data from any suitable source, such as, for example one or more communication nodes 140, 150. This software data may include, for example, one or more commands which enable telematics module 120 to communicate with and manage one or more control modules 130, 132, 134.

Telematics module 120 may use the software data to program or reprogram control modules 130, 132, 134. Such software data may be, for example, software bulletins that update software currently available on a given control module.

The software data may also include commands that enable telematics module 120 to test the efficacy of a given control module 130, 132, 134. Alternatively, the software data may enable other functions of telematics module 120 in communication with a given control module, such as the monitoring of control modules 130, 132, 134. Thus, telematics module 120 may be used to test a given control module's efficacy or functions. This may be particularly useful as a diagnostic test that may be done without opening vehicle 210, or indeed, without bringing vehicle 210 to a service center.

The software data may also include commands that indicate one or more user preferences for a particular vehicle system. These user preferences may be indicated for example, via a user interface with communication node 140, 150. In one embodiment of the invention, a user may use advisor 255 as a user interface to node 140, 150 and thus to telematics module 120. For example, a subscriber may indicate to advisor 255 that he wishes to enable child safety locking on the back doors of his vehicle. Advisor 255 may then communicate this preference to communication node 140, 150 which then sends software data enabling child safety locking to the telematics module of the subscriber's vehicle.

As seen at block 504, telematics module 120 may then establish communication with the control module 130, 132, 134 to be updated. Using the above example, telematics module 120 would establish communication with the door/window vehicle system control module. The control module to be updated may be an already installed component of vehicle 210, which is connected to data communication bus 115.

As seen at block 506, telematics module 120 may then forward software data to the control module to be updated. In one embodiment of the invention, the software data forwarded to the control module may be the data received by telematics module at block 502. Alternatively, telematics module 120 may issue one or more commands to the control module to be updated such as commands for reprogramming the control module 130, 132, 134.

As seen at block 508, telematics module 120 may determine if the updated control module is functional. In one embodiment of the invention, the control module may be functional once it has received all of a predetermined set of software instructions from telematics module 120. Alternatively, the updated control module may be considered functional once it has received all of a given software update from communication node 140, 150. Alternatively, telematics module 120 may determine that the control module 130, 132, 134 is functional if the control module is able to perform a predetermined set of functions. That is, telematics module 120 may be enabled to test a control module to determine if the module is functioning.

If the added control module is not yet functional, telematics module 120 may return to block 506 and continue to forward data until the control module 130, 132, 134 is determined to be functional.

As seen at block 510, once the control module 130, 132, 134 is determined to be functional, telematics module 316 may be updated with information about the added control module. Such information may include the hardware and software specifications of the control module as well information about the control module's compatibility with other control modules, with various vehicle systems and/or with telematics module 120.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of assembling a vehicle using a communication node comprising:
    monitoring a communications bus for at least one control module;
    requesting at least one software bulletin from a communication node in response to the at least one control module;
    receiving the at least one requested software bulletin;
    updating the at least one control module with the at least one software bulletin.

2. The method of claim 1, wherein the control module is an added control module, and the added control module is operatively adapted to control at least one other vehicle function.

3. A method of servicing a vehicle using a communication node comprising:
    monitoring a communications bus for at least one control module;
    requesting at least one software bulletin from a communication node in response to the at least one control module;
    receiving the at least one requested software bulletin;
    updating the at least one control module with the at least one software bulletin.

4. The method of claim 3 wherein the control module is an added control module, and the added control module is operatively adapted to control at least one other vehicle function.

5. The method of claim 3, wherein the control module is a replacement control module operatively adapted to control the at least one existing vehicle function.

6. The method of claim 3 further comprising:
    removing an existing control module, the existing control module operatively adapted to control at least one existing vehicle function.

7. A method of remotely servicing a vehicle using communication node comprising:
    monitoring a communications bus for at least one control module;
    requesting at least one software bulletin from a communication node in response to the at least one control module;
    receiving the at least one requested software bulletin;
    updating the at least one control module with the at least one software bulletin.

8. A computer usable medium including a program for assembling a vehicle comprising:
    computer program code for monitoring a communications bus for at least one control module;
    computer program code for requesting at least one software bulletin from a communication node in response to the at least one control module;
    computer program code for receiving the at least one requested software bulletin;
    computer program code for updating the at least one control module with the at least one software bulletin.

9. The medium of claim 8, wherein the control module is an added control module, and the added control module is operatively adapted to control at least one other vehicle function.

10. A computer usable medium including a program for servicing a vehicle comprising:
    computer program code for monitoring a communications bus for at least one control module;
    computer program code for requesting at least one software bulletin from a communication node in response to the at least one control module;
    computer program code for receiving the at least one requested software bulletin;
    computer program code for updating the at least one control module with the at least one software bulletin.

11. A computer usable medium including a program for remotely servicing a vehicle comprising:

computer program code for monitoring a communications bus for at least one control module;

computer program code for requesting at least one software bulletin from a communication node in response to the at least one control module;

computer program code for receiving the at least one requested software bulletin;

computer program code for updating the at least one control module with the at least one software bulletin.

12. A vehicle assembly system comprising:

means for monitoring a communications bus for at least one control module;

means for requesting at least one software bulletin from a communication node in response to the at least one control module;

means for receiving the at least one requested software bulletin;

means for updating the at least one control module with the at least one software bulletin.

13. The system of claim 12, wherein the at least one control module is an added control module, and the added control module is operatively adapted to control at least one other vehicle function.

14. A vehicle servicing system comprising:

means for monitoring a communications bus for at least one control module;

means for requesting at least one software bulletin from a communication node in response to the at least one control module;

means for receiving the at least one requested software bulletin;

means for updating the at least one control module with the at least one software bulletin.

15. The system of claim 14, wherein the at least one control module is an replacement control module operatively adapted to replace at least one existing control module controlling at least one other vehicle function.

16. The system of claim 14, wherein the at least one control module is an added control module operatively adapted to control at least one other vehicle function.

17. A remote vehicle servicing system comprising:

means for monitoring a communications bus for at least one control module;

means for requesting at least one software bulletin from a communication node in response to the ax least one control module;

means for receiving the at least one requested software bulletin;

means for updating the at least one control module with the at least one software bulletin.

* * * * *